United States Patent
Maine et al.

(10) Patent No.: US 8,707,249 B2
(45) Date of Patent: Apr. 22, 2014

(54) WORKFLOW EXECUTION MODEL

(71) Applicant: Microsoft Corporation, Redmond, WA (US)

(72) Inventors: Stephen Jared Maine, Seattle, WA (US); Justin David Brown, Seattle, WA (US); Edmund Samuel Victor Pinto, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/922,197

(22) Filed: Jun. 19, 2013

(65) Prior Publication Data

US 2013/0282681 A1    Oct. 24, 2013

Related U.S. Application Data

(63) Continuation of application No. 12/726,133, filed on Mar. 17, 2010, now Pat. No. 8,484,610.

(51) Int. Cl.
*G06F 9/44* (2006.01)

(52) U.S. Cl.
USPC ........... 717/104; 717/109; 717/114; 717/115; 717/120

(58) Field of Classification Search
None
See application file for complete search history.

(56) References Cited

U.S. PATENT DOCUMENTS

| | | | |
|---|---|---|---|
| 6,065,009 A | 5/2000 | Leymann et al. | |
| 7,051,071 B2 * | 5/2006 | Stewart et al. | 709/204 |
| 7,428,519 B2 | 9/2008 | Minsky et al. | |
| 7,451,432 B2 | 11/2008 | Shukla et al. | |
| 8,484,610 B2 | 7/2013 | Maine et al. | |
| 2006/0074733 A1 | 4/2006 | Shukla et al. | |
| 2007/0266368 A1 | 11/2007 | Szpak et al. | |
| 2008/0229228 A1 | 9/2008 | Cohen | |
| 2009/0172691 A1 | 7/2009 | Barros et al. | |
| 2009/0198532 A1 | 8/2009 | Litoiu et al. | |
| 2009/0198546 A1 | 8/2009 | Earle et al. | |
| 2011/0231812 A1 * | 9/2011 | Maine et al. | 717/106 |

FOREIGN PATENT DOCUMENTS

WO    WO 0058873    10/2000

OTHER PUBLICATIONS

Aversano et al., "Introducing Workflow Management in Software Maintenance Processes", Published Date: 2001 http://ieeexplore.ieee.org/stamp/stamp.jsp?&arnumber=972757&isnumber=20964 (10 pages) (The month of Publication is irrelevant since the year of Publication is clearly prior to the filing of the Application).

(Continued)

*Primary Examiner* — Chuck Kendall
(74) *Attorney, Agent, or Firm* — Ben Tabor; David Andrews; Micky Minhas (57) ABSTRACT

A generalized workflow execution model is configured to provide access to workflow elements. A computer system instantiates a generalized workflow execution model that provides access to workflow elements stored in a database that is connected to the workflow execution model. The workflow execution model includes the following: activity models that include both agents which are configured to express the control flow of the activity models and symbols which represent values usable by the activity models and metadata configured to identify the workflow execution model. The computer system also receives user input requesting workflow elements and accesses the database to provide the requested workflow elements using the generalized workflow execution model.

20 Claims, 4 Drawing Sheets

(56) References Cited

OTHER PUBLICATIONS

Alonso et al., "Advanced Transaction Models in Workflow Contexts" Published Date: 1996 http://www.workflowpatterns.com/documentatino/documents/AAA+96.pdf (8 pages) (The month of Publication is irrelevant since the year of Publication is clearly prior to the filing of the Application).

U.S. Appl. No. 12/726,133, mailed Jan. 29, 2013, Office Action.

U.S. Appl. No. 12/726,133, mailed Apr. 10, 2013, Notice of Allowance.

* cited by examiner

WORKFLOW EXECUTION MODEL

CROSS-REFERENCE TO RELATED APPLICATIONS

This application is a continuation of U.S. patent application Ser. No. 12/726,133 filed on Mar. 17, 2010, entitled "WORKFLOW EXECUTION MODEL," which issued as U.S. Pat. No. 8,484,610 on Jul. 9, 2013, and which application is expressly incorporated herein by reference in its entirety.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be designed using workflows. These workflows describe interactions between various workflow activities. Each workflow activity is a portion of executable content whose execution can be triggered as specified in the workflow. Once the activities have been arranged by the user, the workflow may be processed and executed. The resulting program then executes as arranged by the user.

Workflows are generally designed within a specific workflow system. Such workflow systems, however, are typically non-extensible and only allow for specific types of "one-off" customization.

BRIEF SUMMARY

Embodiments described herein are directed to implementing a generalized workflow execution model configured to provide access to workflow elements. In one embodiment, a computer system instantiates a generalized workflow execution model that provides access to workflow elements stored in a database that is connected to the workflow execution model. The workflow execution model includes the following: activity models that include both agents which are configured to express the control flow of the activity models and symbols which represent values usable by the activity models, and metadata configured to identify the workflow execution model. The computer system also receives user input requesting workflow elements and accesses the database to provide the requested workflow elements using the generalized workflow execution model.

In another embodiment, a computer system instantiates a generalized workflow execution model that provides access to workflow elements stored in a database that is connected to the workflow execution model. The workflow execution model includes the following: activity models that include both agents which are configured to express the control flow of the activity models and symbols which represent values usable by the activity models, and metadata configured to identify the workflow execution model. The computer system receives requests from different user-developed generalized tools, where the tools are compatible with and are configured to interact with the generalized workflow execution model and the workflow elements stored in the database. The computer system also responds to each tool's request, regardless of which specific workflow system the tool was authored for.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to implementing a generalized workflow execution model configured to provide access to workflow elements. In one embodiment, a computer system instantiates a generalized workflow execution model that provides access to workflow elements stored in a database that is connected to the workflow execution model. The workflow execution model includes the following: activity models that include both agents which are configured to express the control flow of the activity models and symbols which represent values usable by the activity models, and metadata configured to identify the workflow execution model. The computer system also receives user input requesting workflow elements and accesses the database to provide the requested workflow elements using the generalized workflow execution model.

In another embodiment, a computer system instantiates a generalized workflow execution model that provides access to workflow elements stored in a database that is connected to the workflow execution model. The workflow execution model includes the following: activity models that include both agents which are configured to express the control flow of the activity models and symbols which represent values usable by the activity models, and metadata configured to identify the workflow execution model. The computer system receives requests from different user-developed generalized tools, where the tools are compatible with and are configured to interact with the generalized workflow execution model and the workflow elements stored in the database. The computer system also responds to each tool's request, regardless of which specific workflow system the tool was authored for.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, as discussed in greater detail below. Embodiments within the scope of the present invention also include physical and other computer-readable storage media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
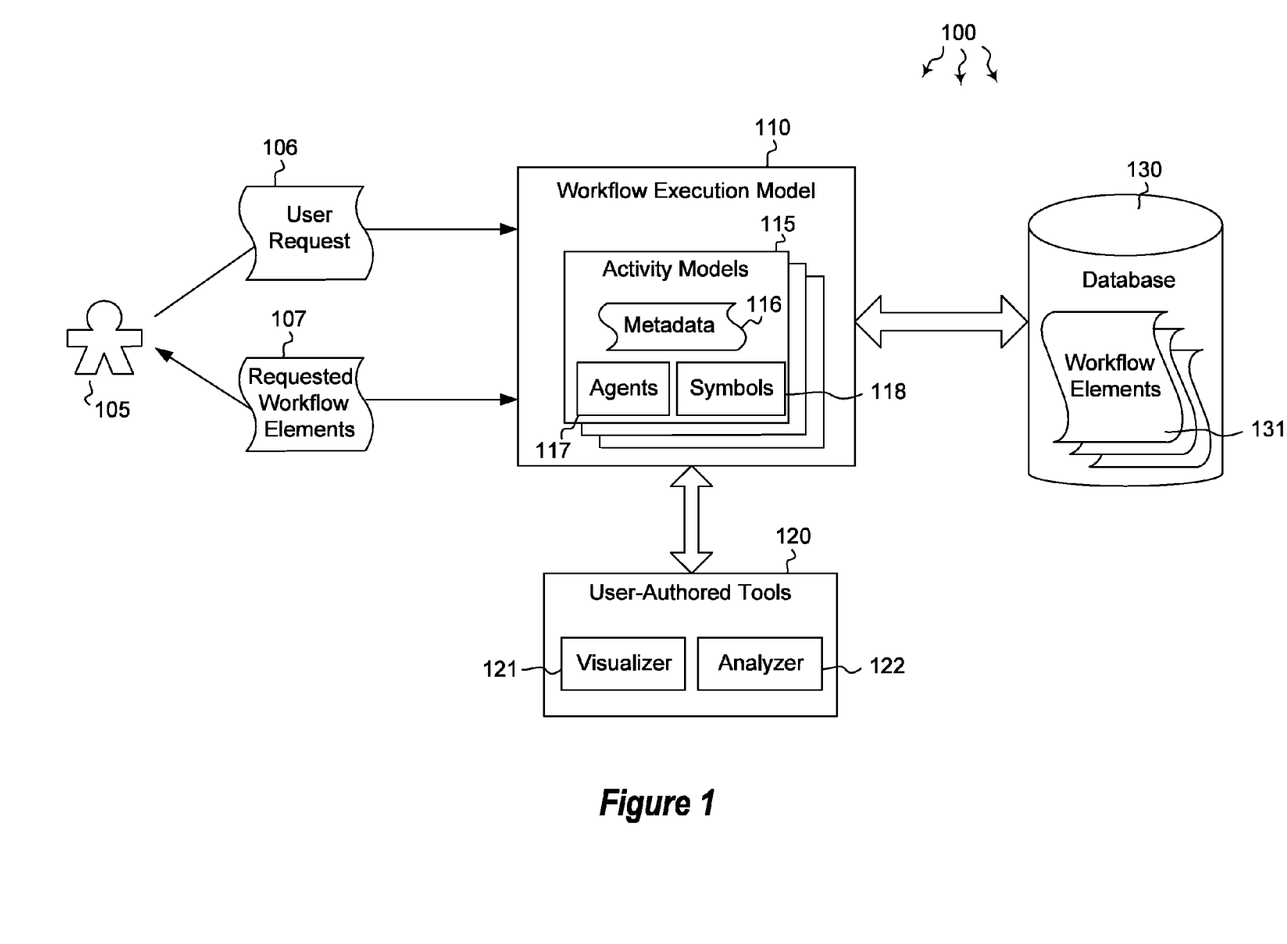
FIG. 1 illustrates a computer architecture in which embodiments of the present invention may operate including implementing a generalized workflow execution model configured to provide access to workflow elements.

FIG. 1 illustrates a computer architecture 100 in which the principles of the present invention may be employed. Computer architecture 100 includes workflow execution model 110. Workflows may be used to control the execution of a software function or application. In some cases, the various functions of an application may be controlled and executed as directed by a corresponding workflow or set of workflows. Workflows are made up of activities, which are generally defined herein as a unit of execution. Accordingly, the initiation of one activity may result in the execution of a function or portion of code. Multiple such activities are linked together and executed using controls flows. As used herein, control flows can control when a given activity is executed, both alone and in relation to the execution of other activities.

The workflow execution model may be a generic model in the sense that it allows many different types of workflow elements (e.g. activities) to be used with many different types of software applications and/or functions. The workflow execution model may, at least in some cases, interface with and interact with a database 130 where one or more of the workflow elements are stored. As will be readily understood by one of ordinary skill in the art, database 130 may by any type of database including a relational database, distributed database, or other type of database.

Workflow execution model 110 includes activity models 115. These activity models include metadata 116 which may be used to identify the activity model and or provide details about the activity model (e.g. its activities, agents and/or symbols). Activity model 115 includes agents 117 and symbols 118. Agents 117 may be configured to express the control flow of the activity model. Accordingly, if an activity model included multiple different functions (or activity models that included an indication of functions) which were to be executed as part of the activity, a schedule agent could schedule the activity models to control how and when the activities are executed. It should be noted that, as used herein, the term "function" may refer to a software function of an activity or to an activity model that provides an indication of (externally defined) software functionality. Symbols 118, as the term is used herein, represent data values that can be used by the activity models during execution of a workflow.

Workflow execution model 110 may be configured to receive inputs from users such as user 105. User 105 may be any type of computer user including an end-user, a software developer, an administrator or any other type of user. User 105 may send a user request 106 to workflow execution model 110 requesting use of one or more workflow elements. The workflow execution model (or simply "model 110") may then access the various requested workflow elements from database 130. After the requested elements 107 have been accessed, they may be sent to user 105. Accordingly, model 110 may allow different users to request and receive workflow elements from database 130 simultaneously. As such, model 110 may be scaled to substantially any number of simultaneous users.

Workflow execution model 110 may also allow users to write generic tools that use any number of workflow elements stored in database 130 (or other network (or internet) accessible databases). Such user-authored tools 120 may include a visualizer 121 and an analyzer 122. The functionality of these tools, as well as a more detailed explanation of the workings of workflow execution model 110, will be explained in greater detail below with regard to method 200 of FIG. 2.

Figure 2:
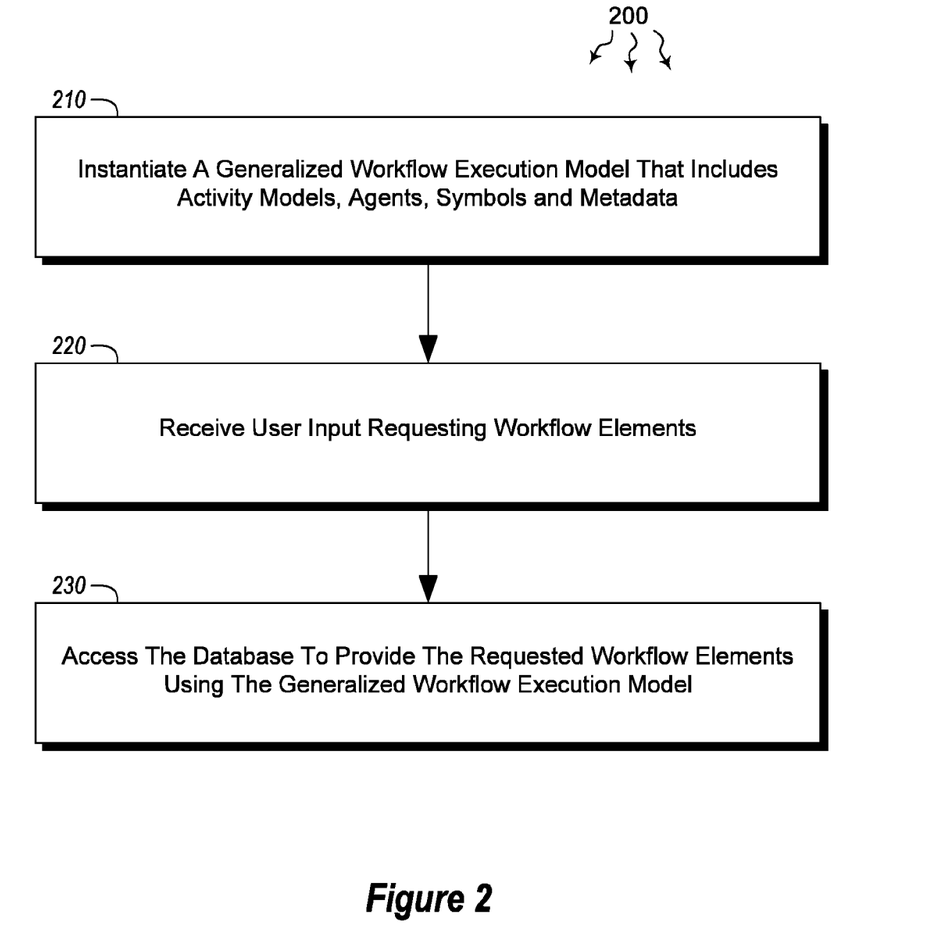
FIG. 2 illustrates a flowchart of an example method for implementing a generalized workflow execution model configured to provide access to workflow elements.

FIG. 2 illustrates a flowchart of a method 200 for implementing a generalized workflow execution model configured to provide access to workflow elements. The method 200 will now be described with frequent reference to the components and data of environment 100.

Method 200 includes an act of instantiating a generalized workflow execution model that provides access to one or more workflow elements stored in a database that is connected to the workflow execution model, wherein the workflow execution model includes the following: one or more activity models that include both agents which are configured to express the control flow of the activity models and symbols which represent values usable by the activity models and a portion of metadata configured to identify the workflow execution model (act 210). For example, a computer system may instantiate workflow execution model 110 that provides access to workflow elements 131 in database 130. Model 110 includes activity model 115 which includes both agents 117 and symbols 116, as well as metadata 116 which uniquely identifies model 110.

In some embodiments, the workflow execution model describes the internal structure of activities, such that the activities' internal structure is available to and is accessible by a user. This internal structure may include, among other things, the activity's control flow. To store a control flow in the database, the control flow is reduced to a generalized control flow using a structured data model that can represent directed execution graphs (i.e. workflow execution model 110). The model (110) provides a general representation of program logic and generally comprises a very reducible execution model. Once the control flow has been reduced or generalized, it can be stored in the DB and accessed via tools or other software applications. In some cases, the specification for a reducing tool (which performs the reducing or generalizing) may be represented in terms of the generalized workflow execution model. Thus, using such a reducing tool, an activity's control flow may be made available to (and is editable by) user 105.

In some cases, a workflow program may be divided into a plurality of workflow elements which are each stored in database tables of database 130. After these workflow elements are stored in the database, each workflow element is then individually accessible by other workflow programs, activity models, agents and workflow tools. Accordingly, database 130 may store (substantially) any number of workflow elements (e.g. activities) which may, themselves, be portions of software programs. Thus, individual functions or software program portions from many different software programs may be accessible using generalized workflow execution model 110. Accordingly, users may combine these software programs in new ways to create new applications. In such embodiments, database 130 is a repository of functionality accessible to any type of workflow through the model 110.

Workflow execution model 110 may be configured to provide an indication of causality relationships within a particular workflow. These causality relationships may indicate which workflow activity led to the execution of another workflow activity. Thus, the causality relationships may allow a user to statically view the definition of a workflow program and trace through the workflow elements to see what would happen upon execution. An analyzer tool 122 may be implemented by a user to perform such a causality analysis. Using the analyzer 122, the user may be able to select a given workflow and trace through each workflow element that would be accessed upon execution of the workflow (using the causality relationships) without actually executing the workflow. Such an analysis may be used for software debugging or as a part of other high-level or low-level code analysis.

The workflow execution model provides an indication of data flow within a workflow program. Such a data flow indication may allow a user to track where a workflow parameter has flowed within the program. For example, a user may want to track a certain variable or other parameter as it is used within a workflow or set of workflows. Using the workflow execution model, a user may select a given parameter and see where that parameter is being used, where changes are being made and which changes are being made at each different stage in workflow execution.

As mentioned above, workflow execution model 110 is a generalized model. Because the model is generalized, it allows users to access the workflow elements with general database and workflow tools. In other words, the model 110 is sufficiently generic as to allow various third party and other general database access and workflow editing and workflow execution tools. As such, third parties may write tools against the model 110 without knowledge of high-level workflow authoring semantics. Continuing along these lines, model 110 also allows users to develop new activity models. These new activity models are usable with other existing workflow elements, which are accessible by querying database 130. Accordingly, these new activity models may be developed using existing workflow elements accessed from the database via the generalized workflow execution model. A reducing tool may be used to reduce the newly developed activity model to a general activity model in compliance with the generalized workflow execution model. The new activity model may then be stored in the database.

In an embodiment, a newly developed activity model may be accessed from database 130 via the generalized workflow execution model 110, upon which the accessed activity model may be executed as part of a workflow. In another embodiment, a newly developed activity model may be accessed from database 130 via the generalized workflow execution model and, thereafter, be analyzed to determine how certain portions of the activity model will execute, before actually executing the accessed activity model.

Returning now to FIG. 2, method 200 also includes an act of receiving user input requesting one or more workflow elements (act 220). For example, workflow execution model 110 may receive user input 106 requesting various workflow elements 131 stored in database 130. As explained above, workflow execution model 110 (and/or database 130) may be scaled to accept and respond to substantially any number of simultaneous requests.

Method 200 includes an act of accessing the database to provide the requested workflow elements using the generalized workflow execution model (act 230). For example, model 110 may access database 130 to provide the requested workflow elements to user 105. The workflow elements provided to the user may then be used as part of a new workflow or may be implemented into an existing workflow. In this manner, a large variety of functionality may be provided to users, with which the users can formulate new workflows that provide new functionality based on the combination of existing software code portions.

Figure 3:
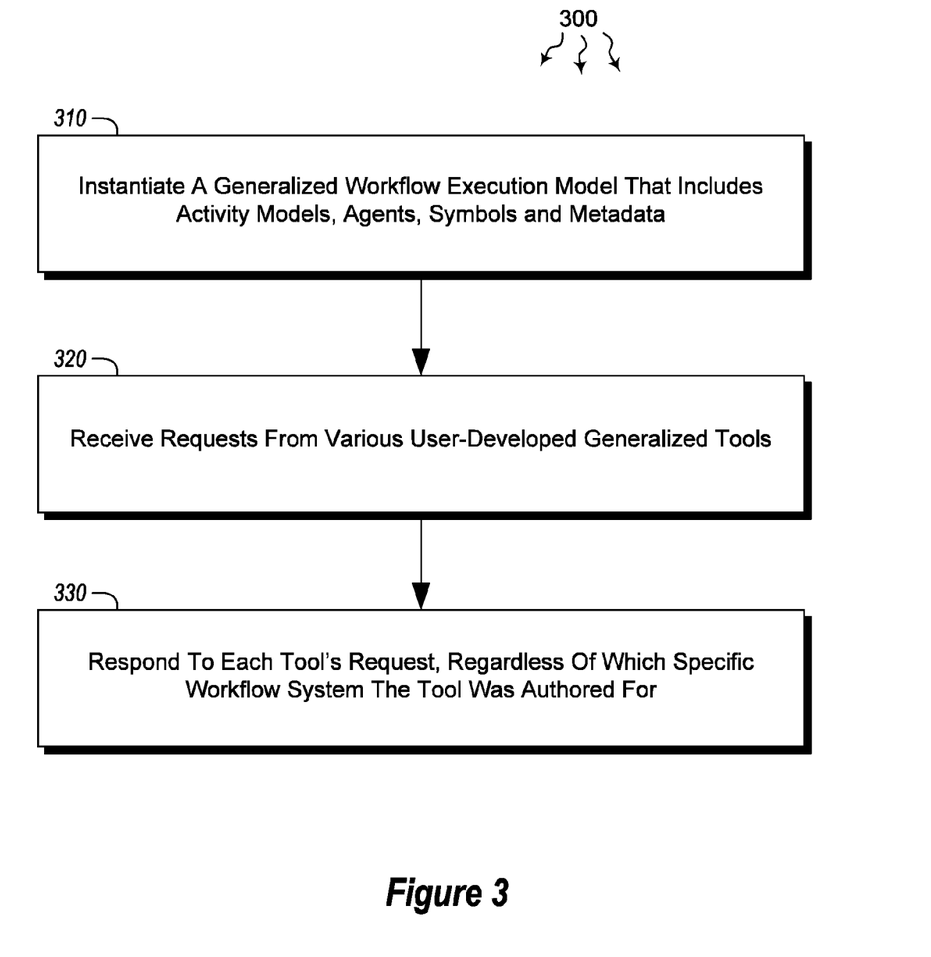
FIG. 3 illustrates a flowchart of an example method for providing a generalized workflow execution model that allows users to author generalized tools for use with the model.

FIG. 3 illustrates a flowchart of a method 300 for providing a generalized workflow execution model that allows users to author generalized tools for use with the model. The method 300 will now be described with frequent reference to the components and data of environment 100.

Method 300 includes an act of instantiating a generalized workflow execution model that provides access to one or more workflow elements stored in a database that is connected to the workflow execution model, wherein the workflow execution model includes the following: one or more activity models that include both agents which are configured to express the control flow of the activity models and symbols which represent values usable by the activity models and a portion of metadata configured to identify the workflow execution model (act 310). For example, a computer system may instantiate workflow execution model 110 that provides access to workflow elements 131 in database 130. Model 110 includes activity model 115 which includes both agents 117 and symbols 116, as well as metadata 116 which uniquely identifies model 110.

In some embodiments, agents 117 may include any of the following: a storage agent configured to move instances of the generalized workflow execution model to and from the database 130, an assignment agent configured to assign the value of an expression to a location indicated by a symbol, a start agent configured to start execution of a workflow and a scheduling agent configured to schedule execution of workflow elements. Many other types of agents are also possible in addition to or as an alternative to those listed. Accordingly, the above agents are listed as examples and are not intended to encompass the entire scope of possible agents which may be used in an activity model.

Similarly, symbols 116 may include many different types of symbols. As used herein, symbols are analogous to variables that allow a user to declare data used by the activity model. An activity model can declare a set of symbols which can comprise "local" symbols, "in" symbols, "out" symbols, and "in/out" symbols, where local symbols are variables and the other symbols are arguments a user could use in the activity. As used herein, local symbols are only available to agents within that (local) activity model. The in, out and in/out symbols may indicate how data is to be moved in and out of an activity model to whoever or whatever is scheduling it. Symbols 116 may also include completion symbols whose scope is defined by the way agents are linked together, and is in scope for downstream agents after the agent that called or declared it. This may be used in loops so that each iteration of the loop has its own copy of the symbol. Symbols may include index identifiers so that the symbols can be referenced. In some cases, symbols may be type-agnostic.

Figure 4:
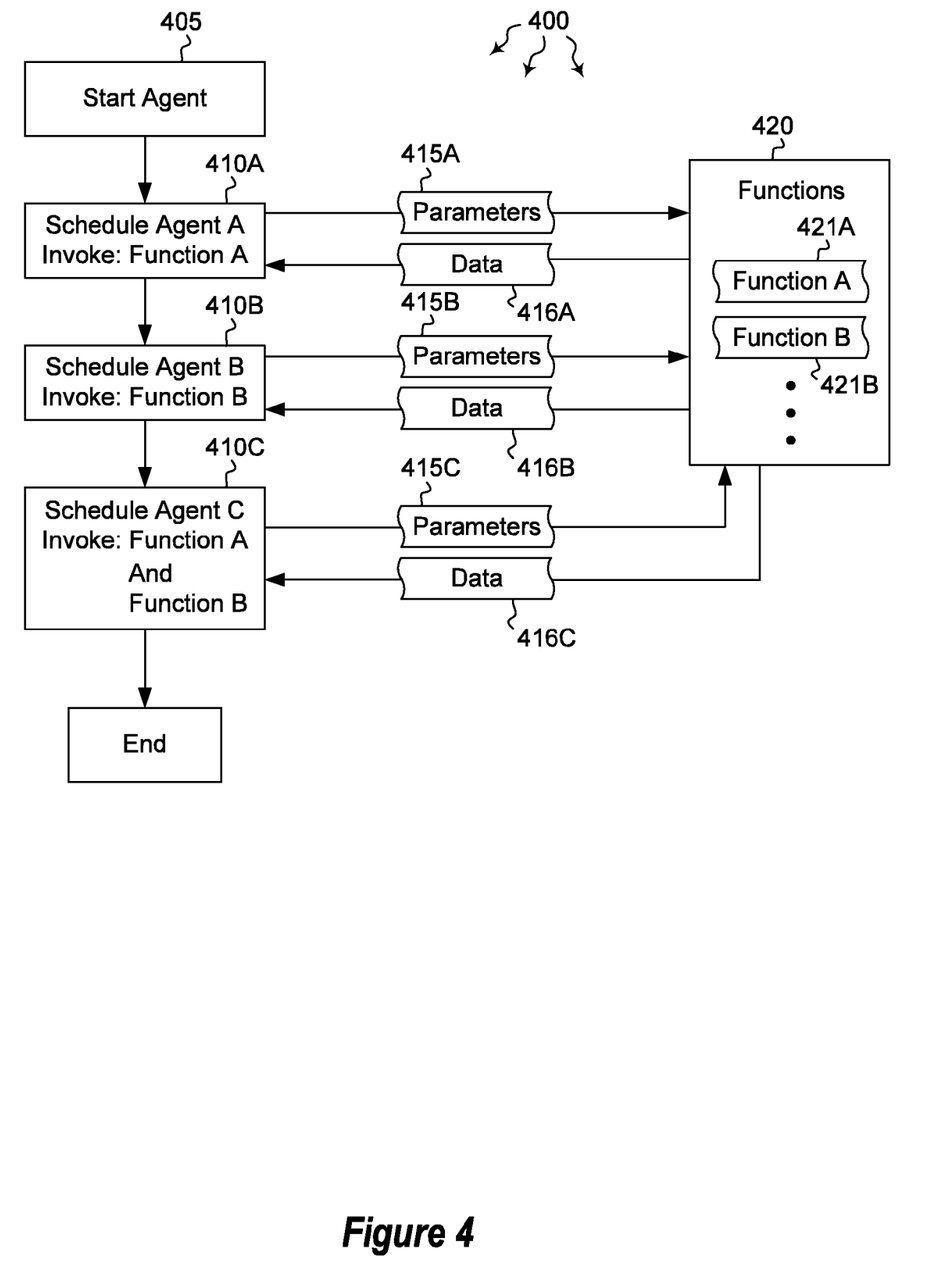
FIG. 4 illustrates an embodiment of the present invention in which workflow elements are provided from a workflow elements database.

Diagram 400 of FIG. 4 provides one example embodiment involving various agents and symbols. For instance, a start agent 405 is provided that starts the execution of a workflow. Schedule agent A (410A) is configured to schedule the invocation of function A with parameters 415A. Functions store 120 (which may be similar to or the same as database 130) includes function A (421A), Function B (421B) and other functions (as represented by the ellipses). Accordingly, after function A has been scheduled, it can be executed, resulting in data 416A being sent back to the scheduling agent A. Schedule agent B (410B) may include an indicator or predicate that states that it is not to begin its scheduling until the data from the execution of Function A has been received at schedule agent A. Thus, after data 416A has been received, schedule agent B can begin scheduling execution of its function(s).

In this manner, schedule agent B schedules the invocation of function B with parameters 415B. Functions store 420 may then execute function B (or pass function B to another module for execution). After function B has been executed, the resulting data 416B is passed to schedule agent B. Upon learning that schedule agent B has received data 416B, schedule agent C may then begin scheduling the execution of its functions (in this example, both functions A and B). It should be noted that scheduling agents can be configured to schedule (substantially) any number of functions for execution as part of a workflow. Thus, schedule agent C (410C) schedules invocation of functions A (421A) and B (421B) with parameters 415C. After execution, data 416C is returned to schedule agent C, upon which workflow execution is ended. Here it should be further noted that parameters 415A-C may include any type of symbols including those described above.

Method 300 includes an act of receiving one or more requests from different user-developed generalized tools, wherein the tools are compatible with and are configured to interact with the generalized workflow execution model and the workflow elements stored in the database (act 320). For example, workflow execution model 110 may receive requests (e.g. 106) from various user-developed generalized tools such as visualizer 121 and analyzer 122. These tools are compatible with and are configured to interact with model 110 and workflow elements 131 stored in database 130.

The visualizer tool 121 may be configured to present a visualization of a workflow to a user. The visualizer may access each element of a given workflow, along with any causality relationships between the workflow elements, and display the workflow to show how each element is linked to the others according to the causality relationships. Such a visualization may include a node-link diagram or any other type of diagram that is configured to show workflow elements and the execution links between them. An analyzer tool 122 may be configured to allow a user to analyze an activity model to determine how certain portions of the activity model will execute, before actually executing the activity model. As explained above, this tool may be useful in debugging or other code analysis.

Method 300 also includes an act of responding to each tool's request, regardless of which specific workflow system the tool was authored for (act 330). For example, model 110 may access database 130 and return the requested workflow elements 107 to the user 105 regardless of which specific workflow system the tool was authored for. Because model 110 is sufficiently generalized, tools written for other workflow systems may be reduced (if necessary) and implemented using model 110. In cases where reduction is necessary, a reducer algorithm may be used to reduce or interpret the tool.

Such reducer algorithms may be provided by the workflow execution model provider, by a third party, or may be generated automatically.

Accordingly, methods, computer systems, and computer program products are provided which are configured to implement a generalized workflow execution model which provides access to workflow elements. These workflow elements may be accessed by a user and/or by various tools for implementation in other workflows or workflow analyses. Because the workflow execution model is sufficiently generic, many different types of workflow execution and analysis tools may be used to access and implement the vast array of functionality that is provided via the workflow execution model.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including a processor and a memory, a computer-implemented method for implementing a generalized workflow execution model configured to provide access to individually accessible workflow elements, the method comprising:
    an act of instantiating a generalized workflow execution model that provides access to one or more workflow elements stored in a database that is connected to the workflow execution model, wherein the workflow execution model includes the following:
        one or more activity models that include both agents which are configured to express the control flow of the activity models and symbols which represent values usable by the activity models; and
        a portion of metadata configured to identify the generalized workflow execution model;
    the one or more workflow elements being stored in the database as individually accessible workflow elements that are individually accessible by workflow programs through the generalized workflow execution model;
    an act of receiving user input requesting one or more of the individually accessible workflow elements; and
    an act of accessing the database to provide the one or more requested individually accessible workflow elements using the generalized workflow execution model.

2. The method of claim 1, wherein at least one of the individually accessible workflow elements is obtained from at least one previous workflow subsequent to the at least one previous workflow being created.

3. The method of claim 1, wherein the generalized workflow execution model allows users to access the workflow elements with general database and workflow tools.

4. The method of claim 1, wherein the generalized workflow execution model allows users to develop new activity models that are usable with other existing workflow elements and wherein the new activity models are developed using existing workflow elements accessed from the database via the generalized workflow execution model.

5. The method of claim 3, wherein a reducing tool is used to reduce the newly developed activity model to a general activity model in compliance with the generalized workflow execution model.

6. The method of claim 5, further comprising an act of storing the newly developed activity model in the database.

7. The method of claim 5, further comprising:
    an act of accessing the newly developed activity model from the database via the generalized workflow execution model; and
    an act of executing the accessed activity model as part of a workflow.

8. The method of claim 5, further comprising:
    an act of accessing the newly developed activity model from the database via the generalized workflow execution model; and
    an act of analyzing the accessed activity model to determine how certain portions of the activity model will execute, before actually executing the accessed activity model.

9. The method of claim 5, wherein the specification for the reducing tool is represented in terms of the generalized workflow execution model.

10. The method of claim 1, wherein the generalized workflow execution model describes the internal structure of activities, such that the activities' internal structure is available to and accessible by the user.

11. The method of claim 1, wherein the generalized workflow execution model allows third parties to write tools against the model without knowledge of high-level workflow authoring semantics.

12. The method of claim 1, wherein the agents include at least one of the following: an assignment agent configured to assign the value of an expression to a location indicated by a symbol, a start agent configured to start execution of a workflow and a scheduling agent configured to schedule execution of workflow elements.

13. The method of claim 1, wherein the generalized workflow execution model provides an indication of one or more causality relationships within the workflow indicating which workflow activity led to the execution of another workflow activity.

14. The method of claim 13, wherein the causality relationships allow a user to statically view the definition of a workflow program and trace through the workflow elements to see what would happen upon execution.

15. The method of claim 1, wherein the generalized workflow execution model provides an indication of data flow within a workflow program allowing a user to track where a workflow parameter has flowed within the program.

16. One or more hardware storage devices having stored thereon computer-executable instructions that, when executed by one or more processors of a computing system, cause the computing system to perform a method for providing a generalized workflow execution model that allows workflow tools to access individually accessible workflow elements with the generalized workflow execution model, the method comprising:
    an act of instantiating a generalized workflow execution model that provides access to one or more workflow elements stored in a database that is connected to the workflow execution model, wherein the workflow execution model includes the following:
        one or more activity models that include both agents which are configured to express the control flow of the activity models and symbols which represent values usable by the activity models; and
        a portion of metadata configured to identify the generalized workflow execution model;
    the one or more workflow elements being stored in the database as individually accessible workflow elements that are individually accessible by workflow programs through the generalized workflow execution model;

an act of receiving user input requesting one or more of the individually accessible workflow elements; and an act of accessing the database to provide the one or more requested individually accessible workflow elements using the generalized workflow execution model.

17. The one or more hardware storage devices of claim 16, wherein at least one of the individually accessible workflow elements is obtained from at least one previous workflow subsequent to the at least one previous workflow being created.

18. The one or more hardware storage devices of claim 16, wherein at least one of the user-authored generalized tools comprises an analyzer configured to allow the user to analyze an activity model to determine how certain portions of the activity model will execute, before actually executing the activity model.

19. A computer system comprising the following:

one or more processors;

system memory;

one or more computer-readable storage media having stored thereon computer-executable instructions that, when executed by the one or more processors, causes the computing system to perform a method for implementing a generalized workflow execution model configured to provide access to workflow elements, the method comprising the following:

an act of instantiating a generalized workflow execution model that provides access to one or more workflow elements stored in a database that is connected to the workflow execution model, wherein the workflow execution model includes the following:

one or more activity models that include both agents which are configured to express the control flow of the activity models and symbols which represent values usable by the activity models; and a portion of metadata configured to identify the generalized workflow execution model;

wherein the one or more workflow elements are stored in the database as individually accessible workflow elements that are individually accessible by workflow programs through the generalized workflow execution model;

an act of receiving user input requesting one or more of the individually accessible workflow elements; and an act of accessing the database to provide the one or more requested individually accessible workflow elements using the generalized workflow execution model.

20. The computer system of claim 19, wherein at least one of the individually accessible workflow elements is obtained from at least one previous workflow subsequent to the at least one previous workflow being created.

* * * * *